United States Patent [19]

Chu et al.

[11] Patent Number: 5,274,231

[45] Date of Patent: Dec. 28, 1993

[54] METHOD AND APPARATUS FOR MANIPULATING ATOMS, IONS OR MOLECULES AND FOR MEASURING PHYSICAL QUANTITIES USING STIMULATED RAMAN TRANSITIONS

[75] Inventors: Steven Chu, Stanford; Mark A. Kasevich, Woodside, both of Calif.

[73] Assignee: Board of Trustees, Leland Stanford Jr. University, Stanford, Calif.

[21] Appl. No.: 868,368

[22] Filed: Apr. 14, 1992

[51] Int. Cl.$^5$ .............................................. H05H 3/00
[52] U.S. Cl. .................................. 250/251; 250/505.1
[58] Field of Search .................... 250/251, 492.1, 505.1

[56] References Cited

U.S. PATENT DOCUMENTS

| | | | |
|---|---|---|---|
| 3,761,721 | 9/1973 | Altshuler et al. | 250/251 |
| 3,778,612 | 12/1973 | Ashkin | 250/251 |
| 4,047,026 | 9/1977 | Bjorkholm et al. | 250/251 |
| 4,327,288 | 4/1982 | Ashkin | 250/251 |
| 4,874,942 | 10/1989 | Clauser | 250/251 |
| 4,992,656 | 2/1991 | Clauser | 250/251 |
| 5,051,580 | 9/1991 | Schneider et al. | 250/251 |

OTHER PUBLICATIONS

C. J. Bordé, "Atomic Interferometry with Internal State Labelling," *Physics Letter A*, vol. 140, No. 1.2, pp. 10-12 (Sep. 4, 1989).

D. W. Keith et al., "An Interferometer for Atoms," *Phys. Rev. Lett.*, vol. 66, No. 21, pp. 2693-2696 (May 27, 1991).

V. P. Chebotayev et al., "Interference of Atoms in Separated Optical Fields," *J. Opt. Sci. Am B*, vol. 2, No. 11, pp. 1791-1798 (Nov. 1985).

D. W. Weiss et al, "The Production and Uses of Slow Atomic Beams," published by ETS Editrice Pisa, Italy (approx. Jun. 1, 1991), including at p. 35 of the Monograph, Light Induced Kinetic Effects on Atoms, Ions and Molecules, *Proceedings of the Workshop*, held in Marciana Marina, Elba Island, Italy, May 2-5, 1990, ETS Editrice Pisa, Italy.

M. Kasevich et al., "Atomic Interferometry Using Stimulated Raman Transitions," *Phys. Rev. Lett.*, vol. 67, No. 2 (Jul. 8, 1991).

(List continued on next page.)

*Primary Examiner*—Jack I. Berman
*Assistant Examiner*—James Beyer
*Attorney, Agent, or Firm*—Townsend and Townsend Khourie and Crew

[57] ABSTRACT

Quantum objects, such as atoms, ions, and molecules, are controllably moved by stimulating selected non-radiative energy levels within a quantum structure in accordance with the principles of stimulated Raman transitions. The movement is effected by timed excitation of individual quantum objects with preselected quantities ("pulses") of electromagnetic energy of at least two different frequencies which together are in resonance with a natural resonance (i.e., a stimulated Raman transition) of preferably metastable energy levels within the quantum object to cause a controlled change in momentum of the quantum object. Specific embodiments employ amplitude modulated collinear beams or multiple beams along different beam paths or collinear beams which are phase coherent but from independent laser sources. In alternative embodiments, single-pulse excitation or multiple-pulse sequence excitation with stimulated Raman transitions produce a controlled change in momentum of individual quantum objects according to the invention. A controlled distribution of velocities of an ensemble of quantum objects may be effected in accordance with the invention. The velocities of the quantum objects are changed and selected using the Doppler effect in both excitation and measurement. Effective pulses may be used to improve sensitivity. The invention may be used to measure forces such as gravity and may be used as a precursor in an atomic mass standard.

42 Claims, 8 Drawing Sheets

OTHER PUBLICATIONS

M. Kasevich et al, "Atomic Velocity Selection Using Stimulated Raman Transitions," *Phys. Rev. Lett.*, vol. 66, No. 18, p. 2297 (May 6, 1991).

"Applications of Laser Cooling and Trapping," *AIP Conference Proceedings* 233, Zorn and Lewis, Editors, Atomic Physics 12 (Twelfth International Conference on Atomic Physics, Ann Arbor, Michigan 1990 (Copyright 1991 by the American Institute of Physics)).

M. Kasevich et al., paper entitled "Measurement of the Acceleration Due to Gravity with an Atomic Interferometer" orally presented at Santa Fe, New Mexico, May 28, 1991, at the Foundations of Quantum Mechanics Conference, to be published by World Scientific, Jun. 1992, Truman Black, Ed.

S. Chu, "Laser Trapping of Neutral Particles," *Scientific American,* pp. 71–77 (Feb. 1992).

S. Chu et al., "An Atomic Fountain Atom Interferometer" orally presented at Font Romeau, France, Jun. 17, 1991, to be published by World Scientific in *Laser Spectroscopy X,* eds. M. Ducloy and E. Giacobino.

METHOD AND APPARATUS FOR MANIPULATING ATOMS, IONS OR MOLECULES AND FOR MEASURING PHYSICAL QUANTITIES USING STIMULATED RAMAN TRANSITIONS

ACKNOWLEDGEMENT OF SPONSORSHIP

This invention was supported in part by grants from the Air Force Office of Scientific Research under Grant Number AFOSR-88-0349 and the National Science Foundation under Grant Numbers PHY-88-01045 and PHY-90-22233.

BACKGROUND OF THE INVENTION

This invention relates to a mechanism for controlling momentum of atoms, molecules or ions which exhibit quantum-level reactions to the quantum stimulation of electromagnetic energy, hereinafter referred to as quantum objects. Specifically, this invention relates to manipulation of internal states of individual quantum objects typically using coherent electromagnetic energy, and more particularly this invention relates to controlled manipulation of individual atoms using stimulated Raman transitions. Specifically, this invention relates to use of stimulated Raman transitions to excite individual atoms to an excited internal energy state which is metastable or substantially non-radiation emissive over time periods of interest.

The principle of stimulated Raman transitions has been known for decades. Stimulated Raman transitions (SRTs) are for example the quantum excitation of an atom using electromagnetic waves of two different frequencies which are mixed (or, in the specific case of only two frequencies, heteeodyned) (i.e., in the same region of space at the same time) to induce a change of internal energy state of the atom. Stimulated Raman transitions can be induced in any quantum object.

An uncontrolled recoil effect has been observed in the course of research on stimulated Raman transitions. Heretofore, the recoil effect has not been harnessed and made useful. What is needed is a technique for controlling the observed recoil effect to do useful physical work.

The Doppler effect is a well-known phenomenon of physics in which the process of reflection causes an observable change in frequency in a reflected wave of radiation due to relative motion. The process of reflection changes the frequency of the radiation according to the formula $\Delta v/v = 2v/c$, where $v$ is the frequency of the radiation, $\Delta v$ the frequency change, $v$ the velocity of the object and $c$ the speed of light. A sensitive frequency difference detector, such as a heterodyne detector, may be used to measure the frequency change $\Delta v$, so that if the initial frequency $v$ is known, the velocity of the object of reflection (i.e., a "mirror") can be determined from the above formula.

This technique, however, does not work well when the mirrors are atoms. There are two problems: an atom is a poor mirror in that it does not reflect a substantial fraction of the incident light, and the light itself exerts forces on the atom which can substantially change the velocity of the atom.

It is known that the properties of an atom (the internal state of the atom) are altered when an atom scatters incident radiation. One aspect of the interaction of light with an atom is that the atom will only absorb or scatter (reflect) light for certain well defined frequencies (called resonances). Furthermore, under certain circumstances, the absorption or emission of the radiation will be accompanied by a change in the internal state of the atom which persists long after the excitation from radiation is ended, herein referred to as a metastable state.

In the case of electromagnetic excitation of quantum objects, such as atoms, ions or molecules, the Doppler effect manifests itself in a more subtle manner: the quantum object will only change its internal state when the velocity of the quantum object is such that the radiation frequency is Doppler shifted to a frequency which resonates with internal quantum levels of the quantum object. Assuming a technique exists to determine selected quantum level states of the target quantum object, the velocity of the quantum object can be measured by changing the frequency of the incident radiation until the quantum object changes its internal quantum state. The velocity could then be determined by comparing this frequency with the known resonance frequency for a quantum object such as an atom at rest, i.e., the velocity would be given by $v/c = \Delta v/v$, where $\Delta v$ now refers to difference between the resonance frequency for a moving atom and the resonance frequency for an atom at rest. This technique has been used in the past, for example, to study atomic collisions, but heretofore the principles have never been controlled and applied to perform useful work.

The accuracy of measuring the velocity of an atom, as a typical quantum object, with a Doppler technique is limited by the accuracy of the measurement of the frequency shift $\Delta v$. The accuracy of this measurement, in turn, is limited by a well known result of the theory of Fourier transforms, namely that $(\delta v)t \sim 1$, where $\Delta v$ is the uncertainty in the frequency measurement and t is the time of the measurement. More accuracy requires longer measurement times. On the other hand, for a fixed time t, accuracy in measurement of v is enhanced by making the probing radiation frequency $v$ as large as possible. For an atom $v$ can be in the visible portion of the electro-magnetic spectrum ($10^{14}$–$10^{15}$ Hz). However, there are two problems associated with the use of optical frequencies. First, the excitation-induced internal quantum state associated with the resonance typically decays back to the atom's original internal quantum state (ground state) in time scales on the order of 10–100 nanoseconds (the lifetime of the resonance). This decay time sets on upper limit on the measurement time t which in turn limits the velocity resolution of the technique. However, atoms possess 'metastable' resonances whose decay times are abnormally long ($\sim$milliseconds). Unfortunately, to make use of the metastable resonances of atoms in particular a light source with a well-defined frequency is required. These are difficult to build, and have absolute stabilities which are presently limited to about 50 Hz, which is not as stable as desired for high-accuracy measurement. What is therefore further needed is a mechanism for improving the accuracy of measurement of Doppler effects on the scale of atoms and the like.

Multiple-pulse sequence excitation is known in the field of optical Ramsey spectroscopy, a superset of stimulated Raman spectroscopy. Optical Ramsey spectroscopy uses coherent superpositions of quantum states to measure frequency of optical radiation. In addition, it is known to use multiple-pulse excitation in connection with the Doppler effect to measure rotations, analogous to the measurements made by a gyroscope. Much of the art concerning the multiple-pulse sequences stems from an alternative view of the coherent interaction of the light with atoms. See Bordé, C. J., *Physics Letters A*, Volume 140, page 10, (1989). This view stresses the momentum exchange which occurs during the interaction and leads to what is called matter-wave interference. Therein the atom is viewed as a quantum mechanical wave with properties analogous to the wave properties of light. (The characteristic wavelength used to describe a matter-wave is the deBroglie wavelength $\lambda_{dB} = h/mv$, where h is Planck's constant and v is the velocity of the atom.) In that approach, matter-wave interference effects lead to the changes in the probabilities of finding an atom in particular internal state. The basic ideas of the Bordé approach are summarized in the following paragraphs in order to distinguish the present invention.

In addition to changing the internal state of the atom, electromagnetic pulses when absorbed in an atom also change the velocity of the atom. The physical reason is conservation of momentum: the total momentum of the combined system consisting of the atom and the laser light field must be conserved during interaction of the atom with the light. Consequently, when an atom absorbs a photon of momentum hk (the photon is the quantum mechanical particle which is used to describe the light field), its velocity must change by $\Delta v = hk/m$, where m is the mass of the atom, $\hbar$ is Planck's constant, and $k = 2\pi/\lambda$ is the propagation vector of the light. This is in addition to the change in the internal quantum state of the atom which occurs as a result of the absorption of the photon. Similar theories explain general stimulated emission processes: in making a transition to an internal state of *lower* energy than the initial internal state, the velocity of an atom also changes as a result of conservation of momentum.

For the multiple-pulse sequences of optical Ramsey spectroscopy (e.g., those referred to in the literature as the sequences having the quantum description $\pi/2$-$\pi$-$\pi/2$, as explained below), the correlation of the internal state of the atom with its velocity leads to a physical splitting and recombination of the atom. (Consider an atom with internal states $|1>$ and $|2>$, as denoted by standard quantum state notation. A "$\pi/2$" light pulse is one which puts the atom in the superposition state $1/\text{sqrt}(2)$ ($|1> + |2>$). A "$\pi$" light pulse takes an atom in the $|1>$ quantum state and drives it to the $|2>$ quantum state. In general, a pulse of area "$a\pi$" (where a is a positive real number) puts the atom in the superposition state $\alpha^2 |1> + \beta^2 |2>$, with $\alpha^2 + \beta^2 = 1$. The values of $\alpha$ and $\beta$ depend on the pulse area. The pulse area depends on the duration of the light pulse, the intensity of the light, the frequency of the light and the velocity of the atom.) It should be understood that associated with each type of pulse sequence is a delay or a space between pulses. For example, the delays in a sequence such as $\pi/2$-$\pi$-$\pi/2$ are substantially equal in duration. Although the delays may in theory be zero, it is preferable that the delays are equal and as great as practical. A reasonable maximum duration of a pulse is 100 μsec, if gravity is a factor. If gravity is not a factor, the duration is not limited. A reasonable maximum duration of a delay is 1000 msec. For other pulse sequences, the delays may be different. For the $\pi/2$-$\pi/2$-$\pi/2$ sequence, the relative delays between pulses are understood also to be equal at the beginning and at the end of the sequence, with the intermediate delay being arbitrarily long within practical limits.

The key components in any interferometer (optical or matter-wave as explained below) are a beam splitting and reflection process. The division and recombination of an atom described above is analogous to that which occurs in an optical Mach-Zehnder interferometer and is therefore useful in constructing a matter interferometer. In a Mach-Zehnder optical interferometer, a light beam (photon) is split in two at a first beam splitter. Mirrors subsequently redirect the two spatially separated paths of light. A final beam splitter recombines the light. The two recombined waves interfere constructively or destructively in the output arm of the interferometer. Analogously, in optical Ramsey spectroscopy, the first $\pi/2$ pulse serves as the matter-wave beam splitter: the part of the atom in internal quantum state $|2>$ takes a different spatial path than the part in internal quantum state $|1>$ as a result of the correlation of the atom's velocity (momentum) with its internal state. The $\pi$-pulse serves as the mirrors: it "reflects" each part of the atom so that the two trajectories will again overlap. The final $\pi/2$ pulse recombines each half of the atom so that the matter waves subsequently interfere.

The potential utility of atom matter-wave interferometers as inertial sensors is known. In 1975, Collela, Overhauser, and Werner demonstrated that the acceleration of a neutron due to gravity could be measured with a matter-wave interferometer. The sensitivity of a matter-wave interferometer to inertial forces can greatly exceed that of a neutron interferometer, largely due to the increased mass of the atom and the availability of slow sources of atoms.

John F. Clauser of the University of California, Berkeley, has investigated the various atom interferometer geometries which utilize micro-fabricated material gratings or standing waves of light to divide and recombine an atom (see U.S. Pat. Nos. 4,874,942 issued Oct. 17, 1989 and 4,992,656 issued Feb. 12, 1991). David Pritchard of the Massachusetts Institute of Technology has experimentally demonstrated matter-wave interference in a geometry consisting of three successive micro-fabricated matter-gratings. (see D. W. Keith et al., *Phys. Rev. Lett.*, Volume 66, page 2693, 1991). The geometry is the same as that used by Marton in 1954 to demonstrate matter-wave interference with electrons.

Interferometers using standing waves of light have also been proposed by Chebotayev (see V. P. Chebotayev et al., *J. Opt. Sci. Am B*, Vol. 2, page 1791 (1985)), and experimental observation of atom diffraction from standing waves has since been observed by Pritchard.

Altshuler and Franz, in U.S. Pat. No. 3,761,721, describe one of the first matter interferometers. Subsequent work in matter interferometry followed general principles described in the Altshuler et al. patent.

Bordé demonstrated optical Ramsey fringes in the 70's and subsequently noted that the fringes can be interpreted as manifestations of matter-wave interference (Bordé 1989, cited above). In the 1989 Bordé work, an atomic beam is described which intersects four spatially separated travelling-wave laser beams oriented perpendicularly to the atomic beam.

The above interferometers which use light to manipulate the atoms do so in geometries where the transit time of the atom through spatially-isolated, independent beams of light, which are oriented perpendicularly to the atom's mean velocity, determines the effective time of interaction of the atom with the light. Furthermore, transit time between successive beams sets the time between interaction with the light.

The work describing the background to the present invention was first presented orally May 2-5, 1990 at Elba Island, Italy. No written descriptions of the background of the invention were made available at that time. An edited report on a proposed experiment to measure acceleration due to gravity using stimulated Raman transitions was first distributed by the publisher ETS Editrice Pisa about Jun. 1, 1991 under the title "The Production and Uses of Slow Atomic Beams," by D. S. Weiss, E. Riis, M. A. Kasevich, K. A. Moler and S. Chu, *Light Induced Kinetic effects on Atoms, Ions and Molecules*, Proceedings of the Workshop Held in Marciana Marina, Elba Island, Italy, May 2-5, 1990, ETS Editrice, Pisa, Italy. Experimental results were published under the title "Atomic Interferometry Using Stimulated Raman Transitions" in *Physical Review Letters*, Vol. 67, Jul. 8, 1991. This paper reported on work where the acceleration due to gravity was measured using Doppler shift accuracy of 3 parts in $10^6$. Subsequent improvements in the technique according to the background of the present invention have placed the experimental resolution at 3 parts in $10^8$.

A report of work on the background of the present invention entitled "Atomic Velocity Selection Using Stimulated Raman Transitions," *Physical Review Letters*. Vol. 66, No. 18, p. 2297 was published on May 6, 1991 under the authorship of the inventors and collaborators D. Weiss, S. Kasapi, E. Riis, and K. Moler. Therein is a report on a demonstrated preparation of an ensemble of atoms with a 300 μm/sec velocity spread (corresponding to an effective one-dimensional temperature of 30 pico-Kelvins). A monograph in which the idea of using stimulated Raman transitions for controlling movement of atoms was reported by the inventors and their collaborators was first released about Aug. 1, 1991 under the title "Applications of Laser Cooling and Trapping," *AIP Conference Proceedings* 233, Zorn and Lewis, Editors, Atomic Physics 12 (Twelfth International Conference on Atomic Physics, Ann Arbor, Mich. 1990 (Copyright 1991 by the American Institute of Physics)). Although these publications appeared before the filing date of the present application, they do not describe the present invention.

SUMMARY OF THE INVENTION

According to the invention, quantum objects, such as atoms, ions, and molecules, are controllably moved by stimulating selected non-radiative energy levels within a quantum structure in accordance with the principles of stimulated Raman transitions. The movement is effected by timed excitation of individual quantum objects with preselected quantities ("pulses") of electromagnetic energy of at least two different frequencies which together are in resonance with a natural resonance (i.e., a stimulated Raman transition) of preferably metastable energy levels within the quantum object to cause a controlled change in momentum of the quantum object. Specific embodiments employ amplitude modulated collinear beams or multiple beams along different beam paths or phase-coherent collinear beams from independent laser sources. In alternative embodiments, single-pulse excitation or multiple-pulse sequence excitation with stimulated Raman transitions produce a controlled change in momentum of individual quantum objects according to the invention. A controlled distribution of velocities of an ensemble of quantum objects may be effected in accordance with the invention. The velocities of the quantum objects are changed and selected using the Doppler effect in both excitation and measurement. Effective pulses may be used to improve sensitivity. The invention may be used to measure forces such as gravity and may be used as a precursor in an atomic mass standard.

The invention may be used to accurately measure changes in velocity of an atom or other quantum object and may be applied to measuring velocity changes arising from the acceleration of an atom due to gravitational or rotational forces and therefore may find applications in atomic interferometry. Instruments such as gravimeters, accelerometers, highly-accurate weight scales, atomic-based weight standards and highly-accurate gyroscopes may be constructed in accordance with principles of the present invention.

DESCRIPTION OF SPECIFIC EMBODIMENTS

This invention relies on stimulated Raman transitions between different internal quantum states of atoms, molecules or ions which exhibit quantum-level reactions, herein referred to as quantum objects, to impart controlled quantities of kinetic energy to the quantum objects. The invention is primarily useful as a measurement tool, rather than a tool for moving quantum objects. However, the invention is based on the ability to control momentum, and therefore movement, at the atomic level.

This invention is based on the discovery that light in the form of stimulated Raman transitions between different internal quantum states of quantum objects can be used to control momentum and thus velocity of individual quantum objects. The relationship is well-known:

$$v = p/m,$$

where m is mass, p is momentum and v is velocity.

Although the interaction with light changes the velocity of the atom, it changes it in an extremely regular way. The velocity kick is proportional to the frequency of the excitation energy, which in a typical system is laser light. The frequency (and thus the phase) of state-of-the-art single-mode laser light sources can easily be stabilized to better than 1 part in $10^{10}$. Hence, extremely accurate instrumentation can be achieved with this technology. For example, stimulated Raman light pulses are a novel class of "beam-splitters" and "mirrors" for atoms.

Figure 1:
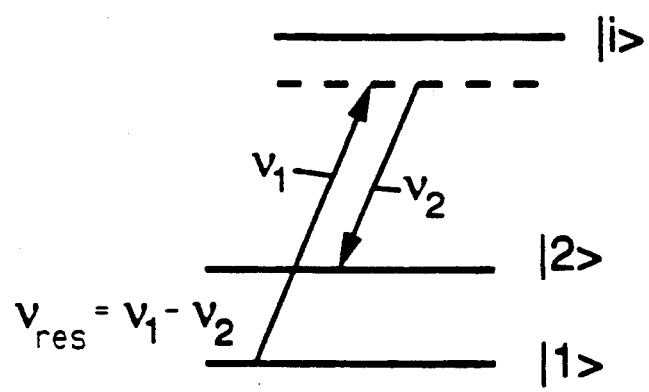
FIG. 1 is a schematic representation of the energy levels of internal quantum states of a quantum object, such as an atom.

Consider the three-state atom shown in FIG. 1. Internal states $|1\rangle$ and $|2\rangle$ are *stable* against decay while state $|i\rangle$ is a high frequency optical resonance. Two light beams frequency $\nu_1$ and $\nu_2$ are nearly resonant with the $|1\rangle \rightarrow |i\rangle$ and $|2\rangle \rightarrow |i\rangle$ transitions respectively. (Exact resonance would cause undesired fluorescence in a system using mixing such as by stimulated Raman transitions.) The frequency difference $\nu_1 - \nu_2$ is chosen to be approximately equal to $\nu_{res}$, the frequency corresponding to the $|1\rangle \rightarrow |2\rangle$ transition. This frequency is typically in an r.f. range, e.g., 100 MHz–100 GHz.

Figure 2:
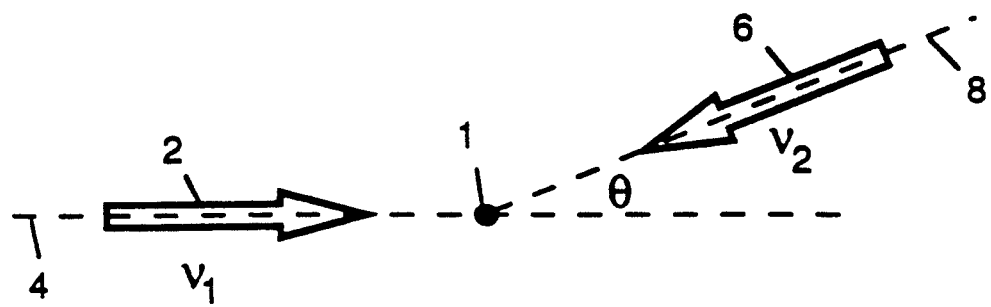
FIG. 2 is a schematic diagram of the geometry employed to effect the stimulated Raman transitions.

FIG. 2 shows a geometry for exciting an atom 1 as a representative quantum object in accordance with the invention. A first laser input 2 at nominal frequency $\nu_1$ is directed along a base axis 4 at the atom 1. A second laser input 6 at nominal frequency $\nu_2$ is directed along a second axis 8 at the atom 1, the second axis 8 being at an angle $\theta$ to the base axis 4. The angle $\theta$ may be any value. Both laser inputs 2 and 6 interact together within the atom 1. The nature of the interaction is dependent on resonance with two internal states of the atom 1 separated by $\nu_{res}$ (which is a substantially nonradiative transition). The exact frequency $\nu_{res}$ is determined by Doppler effects and by recoil shifts. (Recoil shifts are second order terms which result from the Doppler sensitivity of the nonradiative transition. These terms are unimportant if the laser beams do not move relative to one another.) The direction of the laser light controls the direction of the momentum transfer. The inventive process is in contrast to the imparting of momentum to atoms by resonant radiation pressure wherein the direction of momentum transfer is randomized by spontaneous fluorescent emission, as first demonstrated by Otto Frisch over fifty years ago.

Figure 3:
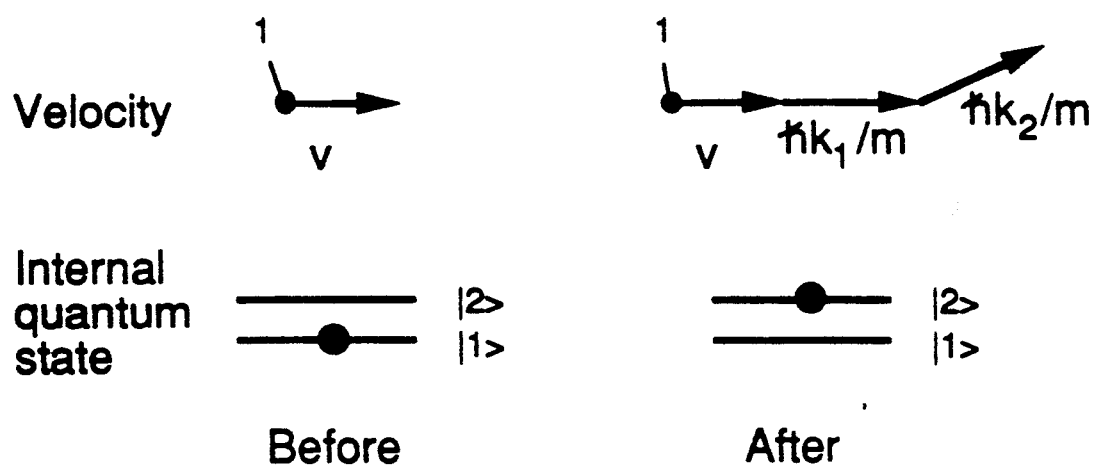
FIG. 3 is a vector diagram illustrating the controlled motion of a quantum object in response to the stimulated Raman transitions.

Referring to FIG. 3, two vector diagrams with a depiction of corresponding energy levels illustrate the controlled motion of a quantum object before and after excitation by the stimulated Raman transitions. In particular, the initial velocity v of atom 1 is modified when excited by a first laser 2 imparting a first velocity kick $\hbar k_1/m$ and simultaneously excited by a second velocity kick $\hbar k_2/m$. The resolution of the velocity and direction is limited only by the uncertainty in the energy and direction of the two photons used to excite the atom. In this invention, the velocity kicks must be together and simultaneous.

Figure 4:
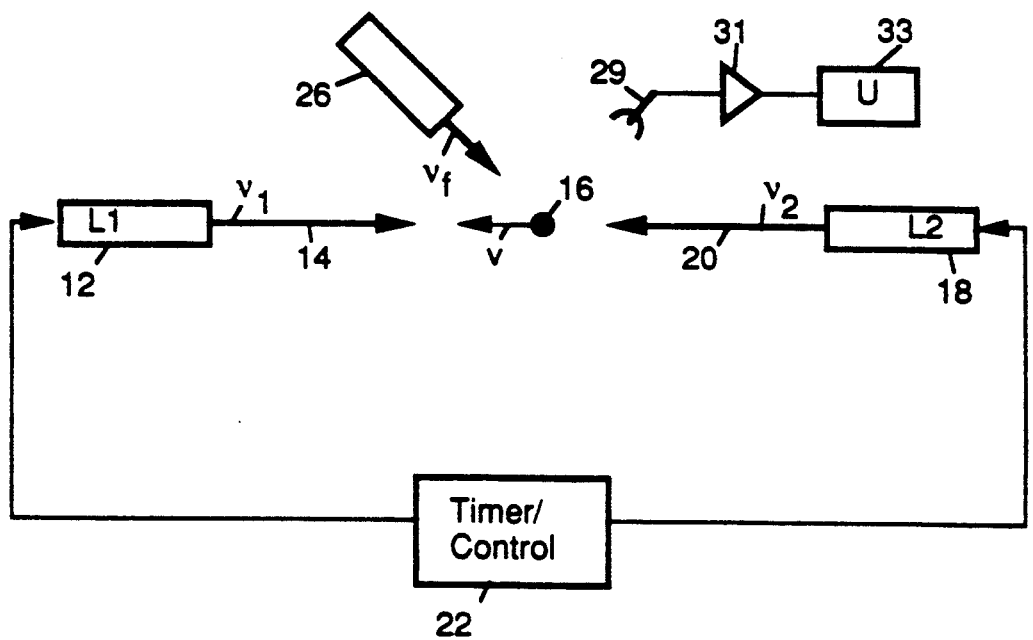
FIG. 4 is a block diagram of a first instrument operative in accordance with the invention.

A basic structure according to the invention is shown in FIG. 4. A first laser 12 capable of emitting a first beam 14 in controlled pulses of frequency $\nu_1$ is disposed to aim its beam 14 at a target atom 16 (or a population of atoms of as little as one atom), and a second laser 18 capable of emitting a second beam 20 in controlled pulses of frequency $\nu_2$ is also disposed to direct its beam 20 at the target atom, and typically in a counterpropagating direction, as hereinafter explained. An atom 16 initially in internal state $|1\rangle$ can be excited to state $|2\rangle$ using stimulated Raman transitions by directing the two laser beams 14 and 20 (which are coherent with one another at least over the duration of the pulse) at the target atom 16 and simultaneously pulsing the atom with energy for an appropriate amount of time (the time depending upon the intensity of the laser beams and other factors, including detuning from the optical resonance). The time is chosen to produce a pulse of substantially well-defined area. A timer/control 22 provides the appropriate timing, frequency/phase coherence (as explained below), and intensity of the simultaneous pulses of laser energy.

This two-photon Raman transition is extremely sensitive to Doppler shifts when the beams 14, 20 at frequency $\nu_1$ and $\nu_2$ are counter-propagating. If atom 16 moves with velocity V towards beam $\nu_1$ (and hence away from beam $\nu_2$) it sees the frequency of $\nu_1$ Doppler shifted by an amount $\Delta\nu_1 = +v\nu_1/c$ and the frequency of $\nu_2$ shifted by an amount $\Delta\nu_2 = -v\nu_2/c$. Thus, the difference frequency is shifted by an amount $\Delta\nu_{Dopp} = \Delta\nu_1 - \Delta\nu_2 = v(\nu_1+\nu_2)/c$, or nearly twice the amount of the Doppler shift of a single laser beam. The frequency of the resonance is indicative of the velocity. In this case, the atom, which has initially been prepared in a quantum level $|1\rangle$ state is frequency scanned with r.f. energy, created by the difference frequency of laser 12 and 18 as determined by timer/controller 22 (the heterodyne light field), over a frequency range including the Doppler-shifted resonance frequency until the atom changes its internal state to quantum level $|2\rangle$. The change of internal state is detected by a conventional quantum state detector, such as a resonant fluorescence detector. (A typical quantum state detector comprises a resonance fluorescer and detector consisting of a laser exciter 26 and a photodetector 29, the laser exciter 26 having an output at an optical transition frequency $\nu_f$ between quantum level $|2\rangle$ and another level which would result in a fluorescence that can be detected by a photodetector 29 indicative that quantum level $|2\rangle$ is populated in the observed atom. This signal is in turn amplified by an amplifier 31 and applied to an output device 33. In a specific embodiment, either one of lasers 12, 18 could be detuned and used as the laser exciter 26. Other schemes may also be used, such as state-selective ionization.)

With this scheme, transitions having a Doppler sensitivity of approximately twice that of an optical transition can be made between states separated in frequency by a radio frequency. If the states are ground-state hyperfine levels, the measurement time t will not be limited by the decay time of the intermediate state $|i\rangle$.

This scheme is useful not only for measuring the velocity of an atom, but also for preparing an "ensemble" of atoms with a known velocity for further processing. If the distribution of atoms is initially in internal state $|1\rangle$ with a large velocity spread, then when such a distribution is illuminated with a "Raman light pulse" (combined beams 14, 20) from lasers 14, 18 of a known frequency difference, only those atoms with a velocity such that they are Doppler shifted into resonance are driven into the $|2\rangle$ state. Those atoms in the $|2\rangle$ state then form an ensemble with a precise preselected mean velocity and velocity spread (velocity distribution).

Use of stimulated Raman transitions allows the velocity spread of atoms making the transition to state $|2\rangle$ to be exceedingly narrow. An ensemble of atoms having a velocity spread of ~300 μm/sec in one dimension has been demonstrated with this technique. Moreover, if the atoms are initially in state $|2\rangle$, they can be assembled in an ensemble in state $|1\rangle$ by this same technique.

Initial preparation of atoms is assumed as a precursor to all of these processes. Well-known techniques are known in the art. For example, to place a population of atoms in an initial state, one could apply optical pumping sufficient to force the population to a single metastable state.

A population of atoms can also be prepared with an initial velocity distribution prior to manipulation using the techniques according to the invention. The technique of laser cooling is an example of a method known for preparing an initial velocity distribution of atoms.

Figure 6:
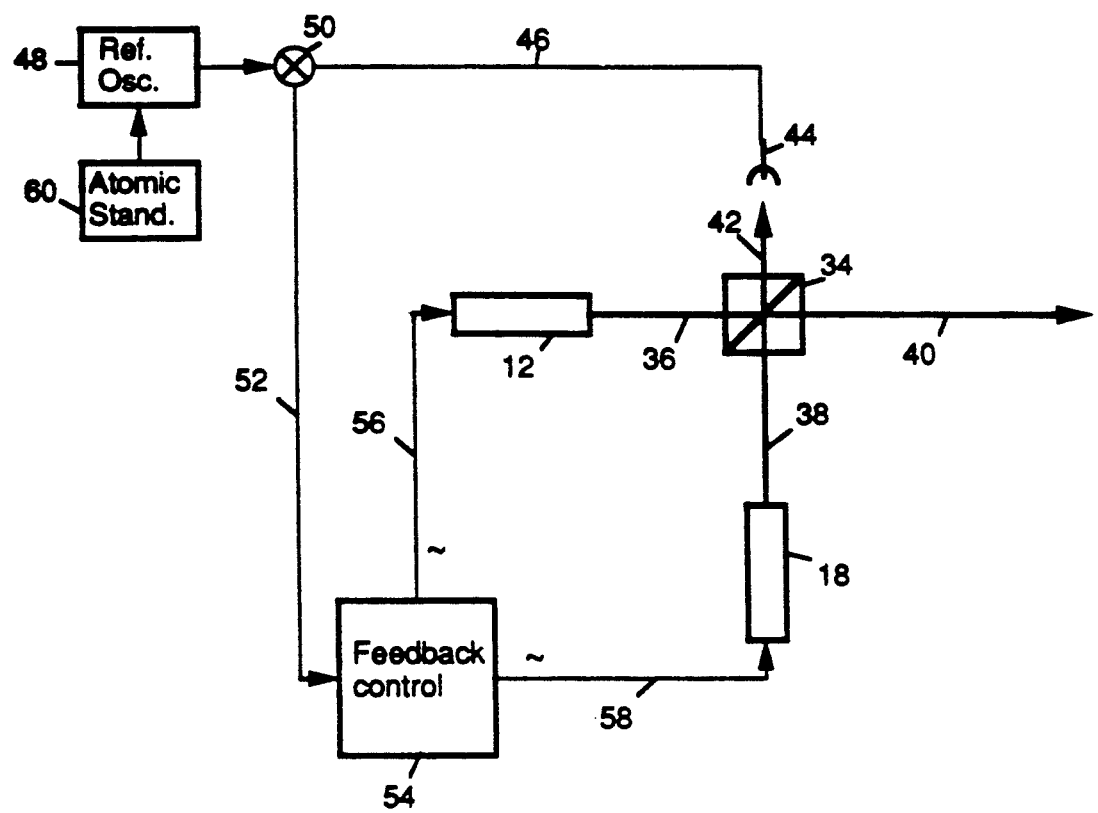
FIG. 6 is a block diagram of an excitation system employing phase coherent lasers producing a heterodyne output signal.

A variety of light sources can be employed in accordance with the invention. Referring to FIG. 6, a first laser 12, a second laser 18 and a beam combiner 34. The lasers produce beams 36 and 38, respectively, directed at the beam combiner 34 so that portions of the beams become collinear as a first composite output 40 and second composite output 42, the second composite output 42 being directed to a photodetector 44, and the first composite output 40 being directed at the target atom 16 (as in FIG. 4). The first and second lasers 12 and 18 must be phase coherent (and thereby frequency coherent) in order to be useful as a stimulated Raman transition excitation source. It is known in the art to keep lasers in phase coherence. FIG. 6 illustrates a simple scheme wherein the signal on signal line 46 from the photodetector 44 is mixed with the output of a reference oscillator 48 in a mixer 50 the mixed output of which on line 52 is applied to a feedback control means 54. The feedback control means 54 generates frequency/phase control signals on lines 56 and 58 to the respective lasers 12 and 18. The purpose of the scheme is to force the frequency difference $v_1 - v_2$ to be equal to the frequency of the reference oscillator 48. The frequency of the reference oscillator is preferably highly stable. For example, the frequency could be derived from the output of an atomic standard 60.

Figure 7:
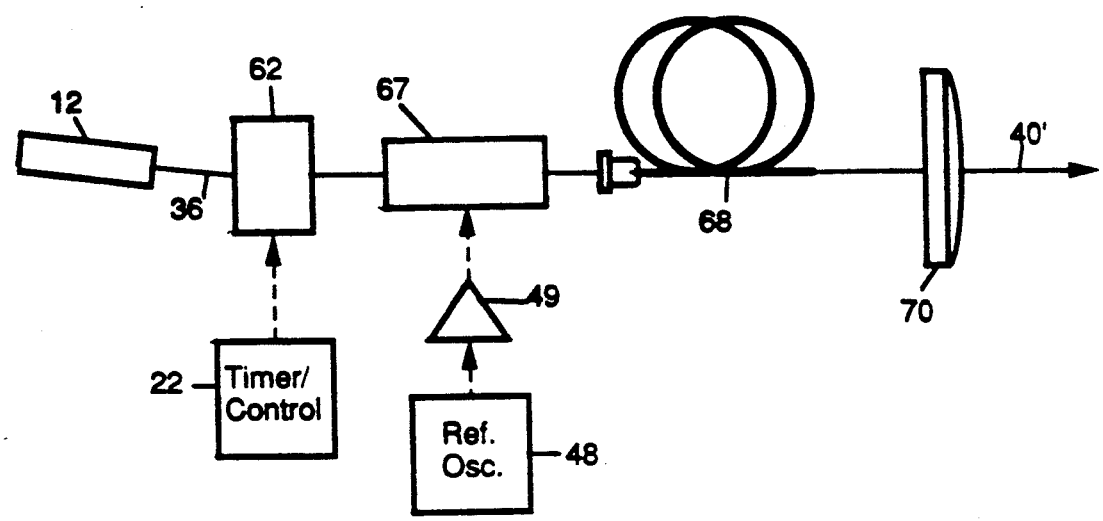
FIG. 7 is a block diagram of an excitation system employing a single laser with an amplitude modulator element producing a heterodyne output signal.

In FIG. 7, an excitation source is shown wherein frequency/phase coherence is a natural consequence of the mechanism. A laser 12 has an output beam 36 directed through an acousto-optic modulator 62, which in turn directs the beam 36 to an amplitude modulator 67, which generates the multiple Raman frequencies employed to excite the quantum objects. Within the amplitude modulator 67, light of an input frequency is split into just two spectral components (collinear beams) which are separated by twice the modulation frequency applied from a reference oscillator 48 and which are frequency/phase coherent with one another. The output of the amplitude modulator 67 is applied to a spatial filter 68, comprising a length of optical fiber. Output of the spatial filter 68 is directed through a collimating lens 70, out of which the output beam 40' is directed to the target, such as an atom 16 (FIG. 4). The acousto-optic modulator 62 is under control of timer/control 22, which controls intensity and pulse duration of the beam 36 applied to the amplitude modulator 67. The amplitude modulator 67 is preferably driven by a power amplifier 49 which in turn is excited by the stable reference oscillator 48. The spatial filter 68 filters the spatial modes of the light beam and stabilizes the light beam against pointing instabilities of the source laser 12. The target atom 16 serves as a final selection filter, depending on its velocity, for interaction with the output beam 40'.

Figure 8:
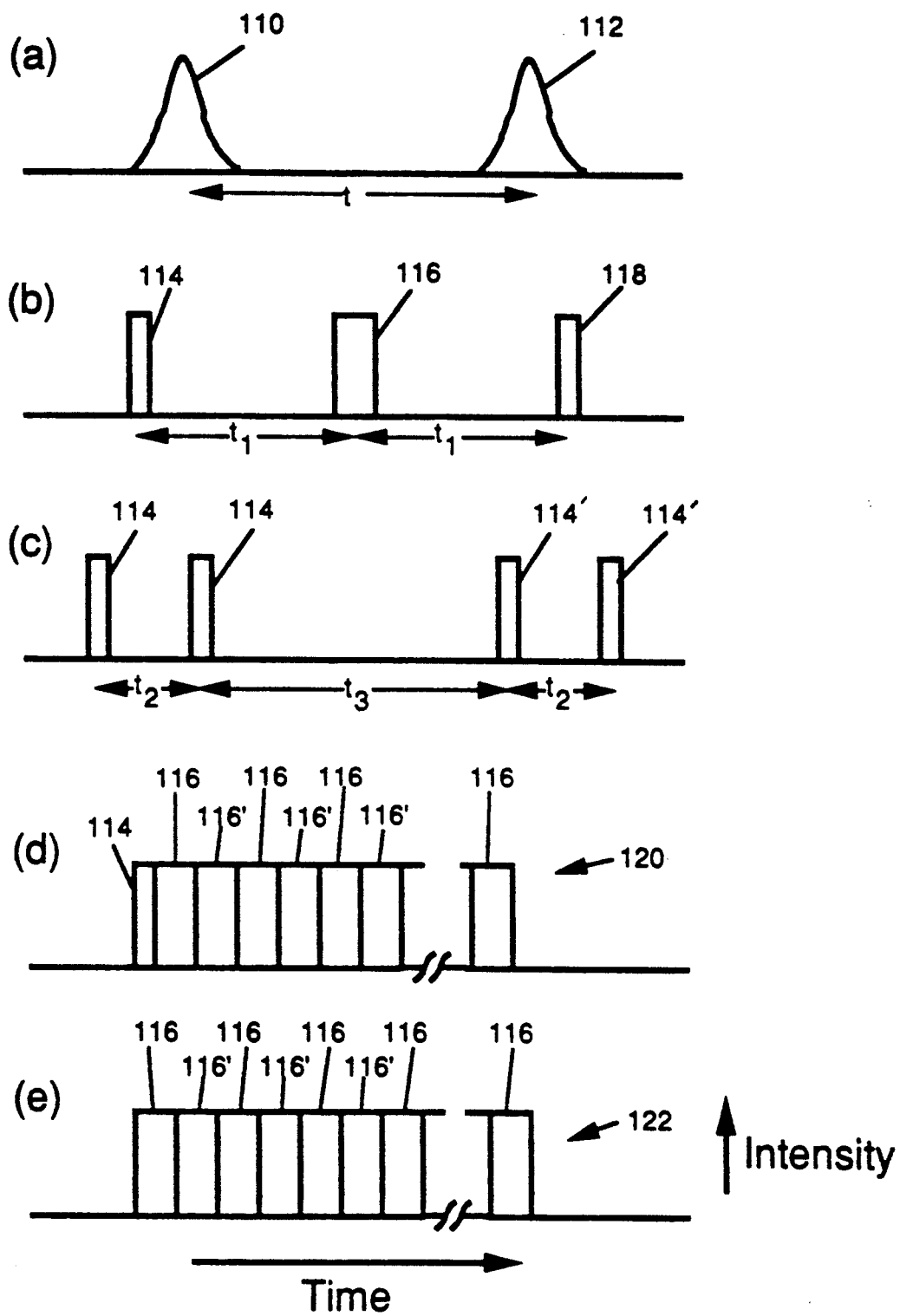
FIGS. 8(a)-(e) are timing diagrams illustrating different types of excitation sequences.

Sequences of stimulated Raman pulses can be combined to excite quantum objects and then to measure *changes* in the velocity of an ensemble of atoms, due for example to external an initial Raman pulse 110 (FIG. 8(a)) of a preselected area can be used to prepare an ensemble, as above, with a distribution of known velocity $v_0$ and velocity spread $\Delta v_0$. The velocity of such an ensemble can be subsequently "measured" by a second Raman pulse 112 of a second pulse area. If an external force, such as gravity, magnetic fields or electric fields, changes the velocity of the atoms during a time t between the pulses, the velocity change will be manifested in a change in the difference frequency $v_1 - v_2$ required to resonantly excite the atoms with the second pulse. This resonant frequency is measured in the same manner as before, for example, by resonant fluorescence detection. The change in the resonant frequency can then be used to calculate the force acting on the atom.

The two-pulse sequence can be used measure the acceleration of an atom due to gravity. The accuracy to which the value of the force can be determined is limited in part by the number of atoms contributing to the resonances. For forces which are independent of the atoms' velocity (such as gravity), a three-pulse series (FIG. 8(b)) or a four-pulse series (FIG. 8(c)) allows for much greater accuracy by allowing more atoms to contribute.

Figure 5:
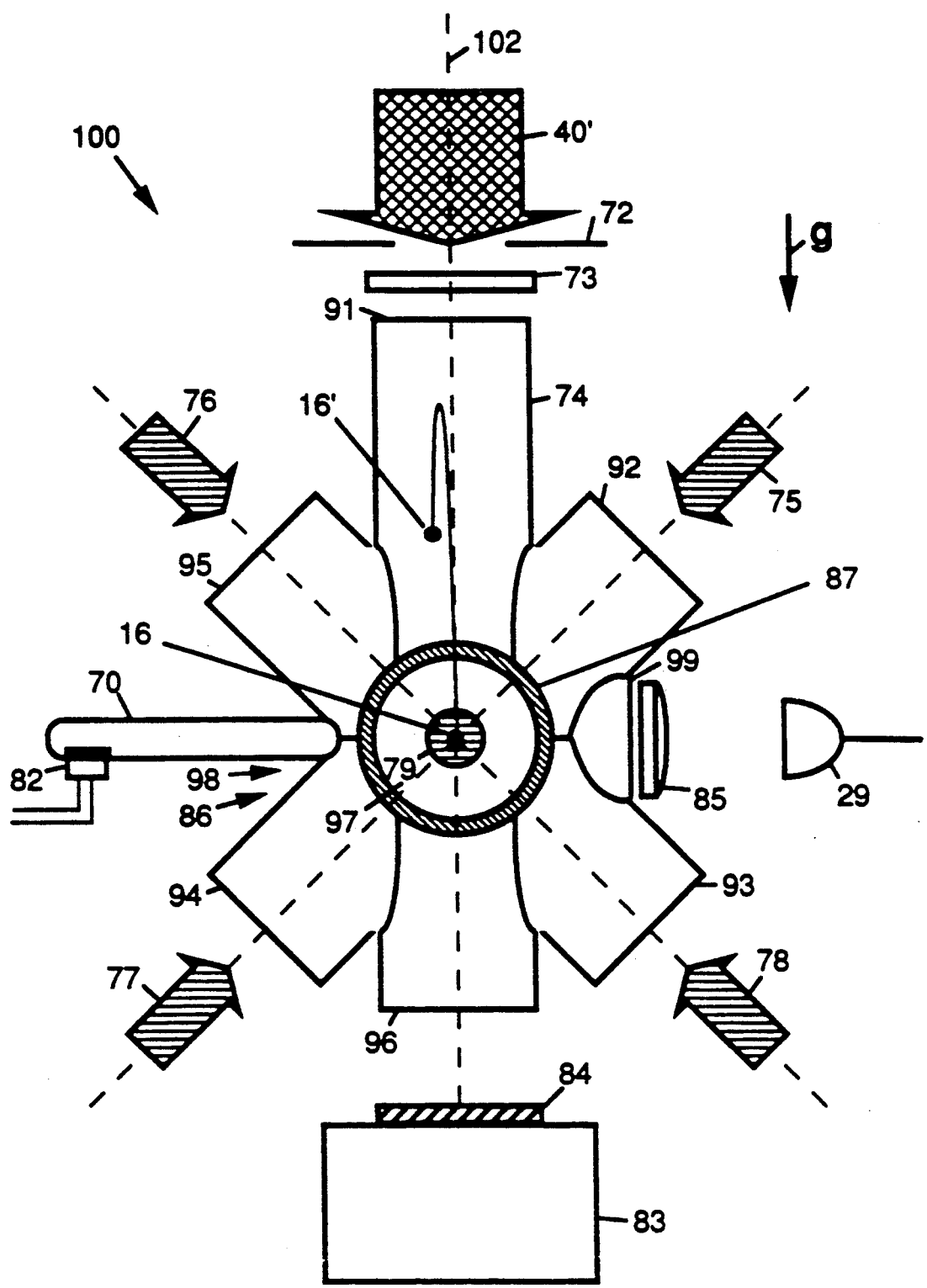
FIG. 5 is a detailed block diagram of a gravimeter.

Referring to FIG. 5, there is shown the basic setup for a high-accuracy gravity-measuring device, or gravimeter 100, according to the invention employing such a multiple-pulse measurement technique. Gravity is measured by "dropping" an atom and measuring the Doppler frequency shift as the atom accelerates. Greater accuracy may be obtained by improving the initial velocity distribution of an ensemble of atoms, by slowing the atoms to allow for longer measurement times and by imparting motion to the atoms in a generally upward direction to allow atoms to change velocity over a greater range within a limited distance. For clarity in this illustration, the sources of laser input light (75, 76, 77, 78, 79, 86) are not shown. In a preferred embodiment, the gravimeter 100 includes an evacuated cell 74 having nine windows 91, 92, 93, 94, 95, 96, 97, 98 (hidden), and 99. The main axis of cell 74 is oriented along a vertical axis 102, which is parallel to gravity g. Windows 92, 93, 94, 95, 97 and 98 are provided for admitting laser radiation from six directions along three orthogonal axes into a target region within the cell 74. Laser beams 75, 76, 77, 78, 79 and 86, herein referred to as the cooling laser beams, converge on the target area in the core of the cell 74. The target area is that location where atoms 16 are initially trapped, and the cooling laser beams, together with a magnetic field, perform the trapping function. The atoms 16 are introduced into the cell 74 through a tube 70 enclosing a conventional atomic condenser/heater 82 through which the partial pressure of atoms in the cell is controlled. The magnetic field is created by magnetic field coils 87, specifically in the form of two spaced-apart current loops, wherein counter-circulating electrical currents create a substantially-spherical quadrupole magnetic field in the region between the loops. The trapping function is preferably performed by the mutual cooperation of the spherical magnetic field and laser cooling radiation attracting the target atoms 16 to the center of the field and slowing the atoms. Bombardment of the target by the six cooling laser beams causes the atoms 16 to slow to a substantially zero motion (near absolute zero temperature) state by conventional laser cooling techniques. This is called a magneto-optic trap.

The atoms 16 within the target area of the converging cooling laser beams form "optical molasses" upon interruption of the magnetic field. The temperature of the atoms is further reduced by laser cooling. The targeted atoms 16 are then in a state to be launched upwardly and released in the ambient gravitational field for measurement of gravitational effects according to the invention.

The atoms 16 are then launched upwardly in an "atomic fountain" by causing the relative frequency (phase) of the cooling laser beams to shift so that a moving wavefront is created which displaces the targeted atoms 16 in a generally upward direction. (Exactly upward movement is not essential, since the measurement technique according to the invention is insensitive to the transverse velocity of the atoms.) The moving atoms are then dropped, as the moving wavefront, created by the cooling laser beams 75, 76, 77, 78, 79 and 86, disappears when the cooling laser beams are extinguished.

Thereafter, a pair of vertically oriented-laser beams 40' directed through the cell 74 and reflected back from a mirror 84 on an inertially-stable platform 83 is pulsed in a series of pulses 110, 112 (FIG. 8(a)) to effect the measurement of the Doppler shift as the atoms 16' are affected by gravity. The pulses 110 and 112 have a quantum pulse area of $\pi$. The beams 40' are first pulsed on (pulse 110) to select an initial velocity for the atoms 16'; this velocity is changed by gravity in an amount gt (g, the acceleration due to gravity, $\sim 9.8$ m/sec) in a time t between the pulses. The second pulse 112 measures velocity change by measuring the final velocity of the ensemble of atoms in accordance with the invention as explained above for a two-pulse sequence. The moving atoms 16' are observed in accordance with the invention by means of a photodetector 29 viewing the internal chamber of the cell 74 through window 99 and a lens 85.

The accuracy of measurement in accordance with the invention may be improved by increasing the number of pulses employed. An example of a three-pulse sequence (FIG. 8(b)) which has been used to measure gravity is a $\pi/2$, $\pi/2$ pulse sequence 114, 116, 118. When equal amounts of time $t_1$ separate each of the three pulses, the operating principle is similar to that of "optical Ramsey resonances" studied by Bordé.

A four-pulse $\pi/2$ sequence (FIG. 8(c)) is useful in selected applications, such as in an atomic mass standard. A four-pulse sequence can be used to produce the interference patterns as a precursor to obtain a precise measurement of the recoil velocity of an atom. In a four-pulse $\pi/2$ sequence, a first $\pi/2$ pulse 114 of a frequency element $\nu_1$ propagating in the x direction and of a frequency element $\nu_2$ propagating in the $-x$ direction is followed after a time $t_2$ by a second $\pi/2$ pulse 114 also of frequency element $\nu_1$ propagating in the x direction and of frequency element $\nu_2$ propagating in the $-x$ direction; thereafter, following a period $t_3$, there is a third $\pi/2$ pulse 114' of frequency element $\nu_2$ propagating in the x direction and of frequency element $\nu_1$ propagating in the $-x$ direction, followed after time $t_2$ by a second $\pi/2$ pulse 114' also of frequency element $\nu_2$ propagating in the x direction and of frequency element $\nu_1$ propagating in the $-x$ direction.

Alternatively, pulses 114' may be replaced by pulses 114 for use of the device as precursor for an accelerometer.

Measurements employing Raman pulses can be improved even more by replacing each $\pi/2$ quantum pulse 114 and each $\pi$ quantum pulse 116 with an "effective" $\pi/2$ pulse 120 (FIG. 8(d)) and an "effective" $\pi$ pulse 122 (FIG. 8(e)). For example, an effective $\pi/2$ pulse 120 consists of an initial $\pi/2$ pulse 114 followed immediately by a series of alternating $\pi$ pulses 116, 116' with minimal time separation between pulses of recoil velocity (with direction) so as to make the recoil kicks additive in sequential excitation. An effective $\pi$ pulse 122 consists merely of a series of $\pi$ pulses 116, 116' of the same such sense and minimal time separation. There is minimal temporal separation between pulses 114, 116', 116 which comprise the effective pulse 120. Specifically, for a $\pi/2$ effective pulse, a $\pi/2$ pulse 114 of a frequency element $\nu_1$ propagating in the x direction and of a frequency element $\nu_2$ propagating in the $-x$ direction is followed immediately by a $\pi$ pulse 116' of frequency element $\nu_2$ propagating in the x direction and of frequency element $\nu_1$ propagating in the $-x$ direction, and is thereafter followed by a $\pi$ pulse 116 of frequency element $\nu_1$ propagating in the x direction and of frequency element $\nu_2$ propagating in the $-x$ direction, with the pulses 116, 116' alternating for the duration of the pulse stream. The effective $\pi$ pulse is obtained by replacing the initial $\pi/2$ pulse 114 with a $\pi$ pulse 116. Use of effective pulses increases Doppler sensitivity and hence the resolution of the instrument. In optical Ramsey spectroscopy, coherent superposition states of the atom are manipulated by the laser light in such a way that a change in the frequency of the laser light by an amount $\Delta\nu \sim 1/t$, t being the time between pulses, leads to a large change in the probability of finding the atom in state $|2\rangle$, for example, after the three-pulse sequence. This technique is proposed as a technique to determine the frequency of the laser for this reason. However, when the laser beams are oriented vertically, the effective frequency of the laser is Doppler shifted by the atom's acceleration due to gravity, so the result of a measurement of the frequency can be interpreted as a measurement of the gravitational acceleration which directly effects the frequency. This type of experiment benefits heavily from the use of stimulated Raman transitions, which, as described above, enables the use of long measurement times.

In terms of the precision of the measurement of gravity, the longer the measurement time, the more precisely the frequency of the transition can be determined (see above). The result is a more precise inferred value for gravity. By using an atomic fountain geometry, measurement times on the order of $\sim 0.5$ sec are attainable for an apparatus $\sim 10$ cm tall.

Laser-cooled atoms, however, are not a prerequisite to successful application of the methods described in the previous paragraphs, and should be viewed as one possible route to towards achieving high measurement precision.

While three-pulse or even four-pulse sequences may be employed for precision measurements of gravity, such sequences may be applied equally well to measurement of any other force on the atom. For example, such sequences can be used to sense rotations. If the laser beams used to generate the Raman pulses are anchored to a reference frame which rotates with angular velocity $\Omega$, the atoms are accelerated by a Coriolis force equal to $2 m\Omega xv$, where m is the mass of the atom and v is the atom's velocity.

One technical problem associated with precision acceleration measurements is vibration isolation. This is because a measurement of the acceleration of the atom is actually a *relative* measurement: the atom's acceleration is an acceleration with respect to some reference coordinate system. With excitation through stimulated Raman transitions in the configuration illustrated in FIG. 5, the reference coordinate system is defined by the mirror 84 used to retro-reflect the light 40' back on itself: any vibrationally-induced acceleration of the mirror will show up as a relative acceleration between the mirror and the atom. This will, in turn, limit the precision of a measurement of gravity by adding vibrational noise to the measurement. State-of-the art vibration isolation techniques can be used to minimize this problem.

In summary, the invention is a method for controllably translating, that is, moving with a highly precise velocity change, a quantum object such as an atom by the mechanism of inducing transitions between generally substantially non-radiative internal levels of the quantum object. This is done by applying a certain class of coherent electromagnetic energy, such as Raman-tuned laser energy, to cause stimulated Raman transitions, in quantum "pulse" form directed to the quantum object to change its momentum. Each Raman-type pulse has a preselected quantum area, time duration and electric field polarization. Each Raman-type pulse is generated by the mixing of two electromagnetic waves of preselected frequencies. While a Raman-type excitation is preferred (created by mixing only two electromagnetic waves), in a more general sense, mixing of more than two electromagnetic waves is within the contemplation of the invention so long as the product of the mixing produces the desired energy-level transition.

Specifically, in the method, two electromagnetic waves of a preselected frequency difference heterodyne to produce the coherent electromagnetic energy which effects stimulated Raman transitions in the quantum object. The resultant heterodyne is called a Raman frequency. A Raman frequency can be varied by varying the frequency of either or both of the source electromagnetic waves.

The method may be applied to observing the internal quantum state of the quantum object to determine the momentum and thereby to ascertain velocity of the quantum object.

In a specific structure, the two electromagnetic waves are directed along different paths to the quantum object, which includes counterpropagating paths.

The method is not limited to temporal pulses, i.e., the quantum object can be moved through the field of energy so that the pulse duration is defined by the transit time. However, it is preferred that the electromagnetic energy be applied in temporal pulse form to the quantum object, and preferably the quantum object is substantially stationary. The quantum object can be rendered substantially stationary by cooling the quantum object.

The invention can be used to measure changes in the velocity of quantum objects. A typical application is a desire to measure velocity changes and one cannot rely on the principle of coherent superposition, as in an atom interferometer where light is used to "divide" the atom (when the spatial location of the atom is viewed as a quantum-mechanical wave function). The measurement may be undertaken by first providing an ensemble of quantum objects of a first preselected velocity range. The ensemble is provided by preparing an ensemble of quantum objects of a first internal state, thereafter inducing transitions between internal levels of selected ones of the quantum objects by applying a first Raman pulse of a first duration to excite only those quantum objects which are substantially within the first preselected velocity range, thereafter inducing transitions between internal levels of quantum objects of the ensemble by applying a second Raman pulse of for example a second duration, to excite only those quantum objects which are within a second preselected velocity range, and thereafter observing the internal quantum state of substantially all of the quantum objects to determine which of the quantum objects have been excited by both the first pulse and by the second pulse in order to reach a conclusion about a change in velocity of those quantum objects. The change in velocity will have been induced at least partially by external forces, such as gravity, electric fields or magnetic fields, that is, by other than the energy from the Raman pulses.

The first pulse area may be equal to the second pulse area, the first pulse duration equal to the second duration, and the first polarization may be equal to the second polarization, and there may be the further step of varying the second preselected Raman frequency with respect to the first preselected Raman frequency and repeating the previous steps in order to scan for a match between the second preselected velocity range and quantum objects prepared at the first preselected velocity range. A match will be apparent for example by means of an observation of fluorescent transitions in atoms using a photodetector, where the fluorescence is an effect of a change in state within the observed atoms.

The method can be further refined by separating quantum objects remaining at the first internal state from the selected quantum objects of the ensemble of quantum objects which are not at the first internal state.

The invention can be used in a three-pulse stimulated Raman transition-based atom interferometer. The method comprises providing an ensemble of quantum objects of a first preselected velocity range as previously described with a first Raman pulse, thereafter inducing transitions between internal levels of quantum objects of the ensemble by applying a second Raman pulse, thereafter inducing transitions between internal levels of quantum objects of the ensemble by applying a third Raman pulse, thereafter observing the internal states of the quantum object to reach a conclusion about a change in velocity of the quantum object induced by external force.

In a specific embodiment, the first pulse has a quantum area of substantially $\pi/2$, thereby causing a resonantly-driven quantum object in an internal quantum state $|1\rangle$ to transition to an equal coherent superposition of states $|1\rangle$ and $|2\rangle$. The second pulse has a quantum area of substantially $\pi$, thereby causing a resonant transition from internal quantum state $|1\rangle$ to internal quantum state $|2\rangle$ with substantially 100% probability, and causing a transition from internal quantum state $|1\rangle$ to internal quantum state $|1\rangle$ with substantially 100% probability. The third pulse has a quantum area of substantially $\pi/2$. This allows an observer to determine the quantum phase of the coherent superposition. Observation is analogous to the observation of quantum phase in an atomic clock, namely, through coherently discriminating the internal quantum states of the quantum object under observation.

A four-pulse method may involve thereafter inducing transitions between internal levels of quantum objects of the ensemble by applying a fourth Raman pulse before detecting the atoms. This is useful in construction of an atomic mass standard, something heretofore never achieved. The four pulses may each be equal to $\pi/2$, with interim delays as noted hereinabove.

The invention has now been described with reference to specific embodiments. Other embodiments will be apparent to those of skill in this art upon reference to the foregoing disclosure. Therefore, the scope of the invention is not to be limited except as indicated by the appended claims, the interpretation of which is to be made in light of this description.

What is claimed is:

1. A method for controllably translating a quantum object such as an atom comprising:

heterodyning two collinear electromagnetic waves of preselected frequency difference created by amplitude modulation to produce coherent electromagnetic energy;

applying said coherent electromagnetic energy in pulse form of preselected area, duration and polarization to the quantum object in order to induce transitions between internal levels of the quantum object to effect stimulated Raman transitions in the quantum object; while directing said coherent electromagnetic energy at the quantum object to change momentum of the quantum object.

2. The method according to claim 1 further including the step of thereafter observing the internal quantum state of the quantum object to determine the momentum and thereby to ascertain velocity of the quantum object.

3. The method according to claim 1 wherein said pulse form of electromagnetic energy has a pulse area of $\pi/2$ thereby to produce an atomic analog of an optical beam splitter for the quantum object.

4. The method according to claim 1 wherein said pulse form of electromagnetic energy has a pulse area of $\pi$ thereby to produce an atomic analog of an optical mirror for the quantum object.

5. A method for controllably translating a quantum object such as an atom comprising:

mixing at least two electromagnetic waves of preselected frequencies to produce coherent electromagnetic energy;

applying said coherent electromagnetic energy in pulse form of preselected area, duration and polarization to the quantum object in order to induce transitions between internal levels of the quantum object; while directing said coherent electromagnetic energy along different paths at the quantum object to change momentum of the quantum object.

6. The method according to claim 5 further including the step of thereafter observing the internal quantum state of the quantum object to determine the momentum and thereby to ascertain velocity of the quantum object.

7. The method according to claim 5 wherein said pulse form of electromagnetic energy has a pulse area of $\pi/2$ thereby to produce an atomic analog of an optical beam splitter for the quantum object.

8. The method according to claim 5 wherein said pulse form of electromagnetic energy has a pulse are of $\pi$ thereby to produce an atomic analog of an optical mirror for the quantum object.

9. A method for measuring changes in the velocity of quantum objects comprising the steps of:

(a) producing a grouping of quantum objects of a first preselected velocity range from an ensemble of quantum objects, by (i) preparing the ensemble of quantum objects of a first internal state;

(ii) thereafter mixing at least two electromagnetic waves of first preselected frequencies to produce first coherent electromagnetic energy;

applying said first coherent electromagnetic energy in pulse form of a first pulse area, a first duration and a first polarization to said ensemble in order to induce transitions between internal levels of selected ones of the ensemble; while directing said first coherent electromagnetic energy at the ensemble of quantum objects to excite only said selected ones of the quantum objects which are substantially within said first preselected velocity range to produce the grouping;

(b) thereafter mixing at least two electromagnetic waves of second preselected frequencies to produce second coherent electromagnetic energy; applying said second coherent electromagnetic energy in pulse form of a second preselected area, second duration and second polarization in order to induce transitions between internal levels of selected ones of the grouping; while directing said second coherent electromagnetic energy at the ensemble of quantum objects, including the grouping, to excite only those selected ones of the quantum objects which are within a second preselected velocity range; and (c) thereafter observing the internal quantum state of substantially all of the quantum objects to determine which of the quantum objects have been excited by both the first pulse form electromagnetic energy and by the second pulse form electromagnetic energy in order to reach a conclusion about a change in velocity of those quantum objects, said change in velocity being induced at least partially by external forces.

10. The method according to claim 9 wherein said first pulse area is equal to said second pulse area, said first duration is equal to said second duration, and said first polarization is equal to said second polarization, further including the step of:

(d) thereafter varying the second preselected frequencies with respect to the first preselected frequencies and repeating steps (a), (b) and (c) in order to scan for a match between said second preselected velocity range and quantum objects prepared at said first preselected velocity range.

11. The method according to claim 9 wherein at least one set of sets consisting of said first pulse area and said second pulse area, said first duration and said second duration, and said first polarization and said second polarization is not equal, further including the step of:

(d) thereafter varying the second preselected frequencies with respect to the first preselected frequencies and repeating steps (a), (b) and (c) in order to scan for a match between said second preselected velocity range and quantum objects prepared at said first preselected velocity range.

12. The method according to claim 11 further including the step, following step (a), of:

separating quantum objects remaining at said first internal state from said selected quantum objects of the grouping of quantum objects which are not at said first internal state.

13. The method according to claim 10 further including the step, following step (a), of:

separating quantum objects remaining at said first internal state from said selected quantum objects of the grouping of quantum objects which are at not at said first internal state.

14. The method according to claim 9 further including the step, following step (a), of:

separating quantum objects remaining at said first internal state from said selected quantum objects of the grouping of quantum objects which are at said first preselected velocity.

15. A method for measuring changes in the velocity of a quantum object comprising of the steps of:

(a) producing a first grouping of quantum objects of a first preselected velocity range from an ensemble of quantum objects by preparing the ensemble of quantum objects of a first internal state; thereafter mixing at least two phase-coherent electromagnetic waves from at least two independent laser sources of first preselected frequencies to produce first coherent electromagnetic energy; applying said first coherent electromagnetic energy in pulse form of a first preselected area, first duration and first polarization in order to induce transitions between internal levels of selected ones of the first grouping; while directing said first coherent electromagnetic energy at the ensemble of quantum objects to excite quantum objects within the ensemble to produce the first grouping;

(b) thereafter mixing at least two phase-coherent electromagnetic waves from at least two independent laser sources of second preselected frequencies to produce second coherent electromagnetic energy; applying said second coherent electromagnetic energy in pulse form of a second preselected area, second duration and second polarization in order to induce transitions between internal levels of selected ones of the ensemble; while direction said second coherent electromagnetic energy at the ensemble of quantum objects, including the first grouping, to excite the quantum objects within the ensemble to form a second grouping;

(c) thereafter mixing at least two phase-coherent electromagnetic waves from at least two independent laser sources of third preselected frequencies to produce third coherent electromagnetic energy; applying said third coherent electromagnetic energy in pulse form of a third preselected area, third duration and third polarization in order to induce transitions between internal levels of selected ones of the second grouping; while directing said third coherent electromagnetic energy at the ensemble of quantum objects, including the first grouping and the second grouping, to excite quantum objects within the ensemble; and (d) thereafter observing the internal states of the quantum objects to reach a conclusion about a change in velocity of the quantum object induced by external force.

16. The method according to claim 15 wherein said first pulse has a quantum area of substantially $\pi/2$, thereby to cause a resonantly-driven quantum object in an internal quantum state $|1\rangle$ to transition to an equal coherent superposition of states $|1\rangle$ and $|2\rangle$; wherein said second pulse has a quantum area of substantially $\pi$, thereby to cause a resonant transition from internal quantum state $|1\rangle$ to internal quantum state $|2\rangle$ with substantially 100% probability, and to cause a transition from internal quantum state $|2\rangle$ to internal quantum state $|1\rangle$ with substantially 100% probability; and wherein said third pulse has a quantum area of substantially $\pi/2$ such that said step (c) operates to coherently discriminate the internal quantum states of quantum objects.

17. The method according to claim 15 for measuring changes in velocity of a quantum object, with the further step following step (c) of:

thereafter mixing at least two electromagnetic waves of fourth preselected frequencies to produce fourth coherent electromagnetic energy; applying said fourth coherent electromagnetic energy in pulse form of a fourth preselected area, fourth duration and fourth polarization in order to induce transitions between internal levels of selected ones of the ensemble; while directing said fourth coherent electromagnetic energy directed at the ensemble of quantum objects to excite quantum objects within the ensemble to change coherent superposition of internal quantum states.

18. The method according to claim 17 wherein said first pulse has a quantum area of substantially $\pi/2$; wherein said second pulse has a quantum area of substantially $\pi/2$; and wherein said third pulse has a quantum area of substantially $\pi/2$; wherein said fourth pulse has a quantum area of substantially $\pi/2$.

19. A method for measuring gravitational acceleration of a quantum object comprising of the steps of:

(a) providing an ensemble of quantum objects of a first preselected velocity range with a mean velocity directed substantially vertically and thereby substantially parallel to gravitational force;

(b) thereafter mixing at least two phase-coherent electromagnetic waves from at least two independent laser sources of first preselected frequencies to produce first coherent electromagnetic energy;

applying said first electromagnetic energy in temporal pulse form of a first pulse area, a first duration, and a first polarization to said ensemble in order to induce transitions between internal levels of selected ones of the quantum objects; while directing said first coherent electromagnetic energy substantially vertically and thereby substantially parallel to gravitational force;

(c) thereafter mixing at least two phase-coherent electromagnetic waves from at least two independent laser sources of second preselected frequencies to produce second coherent electromagnetic energy;

applying said second electromagnetic energy in temporal pulse form of a second pulse area, a second duration, and a second polarization to said ensemble in order to induce transitions between internal levels of selected ones of the quantum objects; while directing said second coherent electromagnetic energy substantially vertically and thereby substantially parallel to gravitational force;

(d) thereafter mixing at least two phase-coherent electromagnetic waves from at least two independent laser sources of third preselected frequencies to produce third coherent electromagnetic energy;

applying said third electromagnetic energy in temporal pulse form of a third pulse area, a third duration, and a third polarization to said ensemble in order to induce transitions between internal levels of selected ones of the quantum objects; while directing said third coherent electromagnetic energy being directed substantially vertically and thereby substantially parallel to gravitational force; and (e) thereafter observing the internal states of the quantum objects to reach a conclusion about a change in velocity of the quantum object induced by gravitational force.

20. The method according to claim 19 wherein said first temporal pulse form has a quantum area of substantially $\pi/2$, thereby to cause a resonantly-driven quantum object in an internal quantum state $|1\rangle$ to transition to an equal coherent superposition of states $|1\rangle$ and $|2\rangle$; wherein said second temporal pulse form has a quantum area of substantially $\pi$, thereby to cause a resonant transition from internal quantum state $|1\rangle$ to internal quantum state $|2\rangle$ with substantially 100% probability, and to cause a transition from internal quantum state $|2\rangle$ to internal quantum state $|1\rangle$ with substantially 100% probability; and wherein said third temporal pulse form has a quantum area of substantially $\pi/2$ such that said step (c) operates as to coherently discriminate the internal quantum states of quantum objects.

21. A method for exciting a quantum object such as an atom comprising:

mixing at least two electromagnetic waves of preselected frequencies to produce coherent electromagnetic energy;

applying said coherent electromagnetic energy in effective pulse form of a preselected area, duration, and polarization to the quantum object in order to induce transitions between internal levels of selected ones of the quantum object; while directing said coherent electromagnetic energy at the quantum object to change momentum of the quantum object, said effective pulse form comprising an initial quantum pulse followed immediately by a stream of alternating quantum pulses with minimal time separation between quantum pulses of recoil velocity to produce recoil kicks and so as to make the recoil kicks additive in sequential excitation.

22. The method according to claim 21 further including the step of thereafter observing the internal quantum state of the quantum object to determine the momentum and thereby to ascertain velocity of the quantum object.

23. The method according to claim 21 wherein said effective pulse form comprises:

a first pulse of a frequency element $\nu_1$ propagating in the x direction and of a frequency element $\nu_2$ propagating in the $-x$ direction followed by a second pulse of area $\pi$ of frequency element $\nu_2$ propagating in the x direction and of frequency element $\nu_1$ propagating in the $-x$ direction.

24. The method according to claim 23 wherein said effective pulse form further comprises:

a third pulse of area $\pi$ and frequency element $\nu_1$ propagating in the x direction and of frequency element $\nu_2$ propagating in the $-x$ direction following said second pulse, said second pulse and all subsequent pulses being $\pi$ pulses alternating for the duration of the quantum pulse stream.

25. The method according to claim 24 wherein said first pulse is a $\pi/2$ pulse and substantially no time separates pulses in the quantum pulse stream in order to produce an effective $\pi/2$ pulse.

26. The method according to claim 24 wherein said first pulse is a $\pi$ pulse and substantially no time separates pulses in the quantum pulse stream in order to produce an effective $\pi$ pulse.

27. An apparatus for controllably translating a quantum object such as an atom comprising:

means for heterodyning two collinear electromagnetic waves of preselected frequency difference by amplitude modulation to produce coherent electromagnetic energy; and means coupled to said heterodyning means for applying and directing said coherent electromagnetic energy in pulse form of preselected area, duration and polarization to said quantum object to effect simulated Raman transitions in the quantum object to change momentum of the quantum object.

28. The apparatus according to claim 27 further including means for observing the internal quantum state of the quantum object to determine the momentum and thereby to ascertain velocity of the quantum object.

29. The apparatus according to claim 27 wherein said pulse form of electromagnetic energy has a pulse area of $\pi/2$ thereby to produce an atomic analog of an optical beam splitter for the quantum object.

30. The apparatus according to claim 27 wherein said pulse form of electromagnetic energy has a pulse area of $\pi$ thereby to produce an atomic analog of an optical mirror for the quantum object.

31. An apparatus for controllably translating a quantum object such as an atom comprising:

means for mixing at least two electromagnetic waves of preselected frequencies to produce coherent electromagnetic energy; and means coupled to said mixing means for applying and directing said coherent electromagnetic energy in pulse form of preselected area, duration and polarization to said quantum object along different paths at the quantum object to induce transitions between internal levels of the quantum object and thereby to change momentum of the quantum object.

32. The apparatus according to claim 31 further including means for observing the internal quantum state of the quantum object to determine the momentum and thereby to ascertain velocity of the quantum object.

33. The apparatus according to claim 31 wherein said pulse form of electromagnetic energy has a pulse area of $\pi/2$ thereby to produce an atomic analog of an optical beam splitter for the quantum object.

34. The apparatus according to claim 31 wherein said pulse form of electromagnetic energy has a pulse area of $\pi$ thereby to produce an atomic analog of an optical mirror for the quantum object.

35. An apparatus for measuring gravitational acceleration of a quantum object comprising:

(a) means for providing an ensemble of quantum objects of a first preselected velocity range, including means for preparing an ensemble of quantum objects of a first internal state with a mean velocity directed substantially vertically and thereby substantially parallel to gravitational force;

(b) first means for mixing at least two phase-coherent electromagnetic waves from at least two independent laser sources of first preselected frequencies to produce first coherent electromagnetic energy;

(c) first means coupled to said mixing means for applying and directing said first coherent electromagnetic energy in pulse form of a first pulse area, a first duration and a first polarization to said quantum object substantially vertically and thereby substantially parallel to gravitational force at the ensemble of quantum objects to induce transitions between internal levels of selected ones of the quantum objects within the ensemble;

(d) second means for thereafter mixing at least two phase-coherent electromagnetic waves from at least two independent laser sources of second preselected frequencies to produce second coherent electromagnetic energy;

(e) second means coupled to said second mixing means for applying and directing said second coherent electromagnetic energy in pulse form of a second pulse area, a second duration and a second polarization to said quantum object substantially vertically and thereby substantially parallel to gravitational force at the ensemble of quantum objects to induce transitions between internal levels of selected ones of the quantum objects within the ensemble;

(f) third means for thereafter mixing at least two phase-coherent electromagnetic waves from at least two independent laser sources of third preselected frequencies to produce second coherent electromagnetic energy;

(g) third means coupled to said third mixing means for applying and directing said third coherent electromagnetic energy in pulse form of a third pulse area, a third duration and a third polarization to said quantum object substantially vertically and thereby substantially parallel to gravitational force at the ensemble of quantum objects to excite quantum objects within the ensemble; and (e) means for thereafter observing the internal states of the quantum objects to reach a conclusion about a change in velocity of the quantum object induced by gravitational force.

36. A method for controllably translating a quantum object comprising:

applying and directing coherent electromagnetic energy in pulse form of preselected area, duration and polarization at the ensemble of quantum objects to induce transitions between internal levels of selected ones of the quantum objects, wherein said electromagnetic energy has been generated by the heterodyning of two collinear electromagnetic waves of preselected frequency difference created by two independent laser sources which are phase coherent with one another to effect stimulated Raman transitions in the quantum object, in order to change momentum of the quantum object.

37. The method according to claim 36 further including the step of thereafter observing the internal quantum state of the quantum object to determine the momentum and thereby to ascertain velocity of the quantum object.

38. The method according to claim 36 wherein said pulse form of electromagnetic energy has a pulse area of $\pi/2$ thereby to produce an atomic analog of an optical beam splitter for the quantum object.

39. The method according to claim 36 wherein said pulse form of electromagnetic energy has a pulse area of $\pi$ thereby to produce an atomic analog of an optical mirror for the quantum object.

40. A method for preparing a controlled grouping of quantum objects from an ensemble of quantum objects, said controlled grouping being of defined velocity and velocity distribution, comprising the steps of:

(a) preparing the ensemble of quantum objects to a substantially uniform predetermined internal state; and (b) applying coherent electromagnetic energy in pulse form of preselected area, duration and polarization to the ensemble of quantum objects to induce transitions between internal levels of selected ones of the quantum objects, wherein said electromagnetic energy has been generated by the heterodyning of two collinear electromagnetic waves of preselected frequency difference which are amplitude modulated to effect stimulated Raman transitions in the quantum objects, such that said selected ones of the quantum objects are classified in the controlled grouping by having a velocity within a preselected velocity range within the ensemble.

41. A method for preparing a controlled grouping of quantum objects from an ensemble of quantum objects, said controlled grouping being of defined velocity and velocity distribution, comprising the steps of:

(a) preparing the ensemble of quantum objects to a substantially uniform predetermined internal state; and (b) applying coherent electromagnetic energy in pulse form of preselected area, duration and polarization to the ensemble of quantum objects to induce transitions between internal levels of selected ones of the quantum objects, wherein said electromagnetic energy has been generated by the mixing of at least two electromagnetic waves of preselected frequencies and directed along different paths at the quantum objects to effect stimulated Raman transitions in the quantum objects, such that said selected ones of the quantum objects are classified in the controlled grouping by having a velocity within a preselected velocity range within the ensemble.

42. A method for preparing a controlled grouping of quantum objects from an ensemble of quantum objects, said controlled grouping being of defined velocity and velocity distribution comprising the steps of:

(a) preparing the ensemble of quantum objects to a substantially uniform predetermined internal state; and (b) applying coherent electromagnetic energy in pulse form of preselected area, duration and polarization to the ensemble of quantum objects to induce transitions between internal levels of selected ones of the quantum objects, wherein said electromagnetic energy has been generated by the heterodyning of two collinear electromagnetic waves of preselected frequency difference created by two independent laser sources which are phase coherent with one another to effect stimulated Raman transitions in the quantum objects, such that said selected ones of the quantum objects are classified in the controlled grouping by having a velocity within a preselected velocity range within the ensemble.

* * * * *